L. GEDNEY.
GARDEN WEEDER.
APPLICATION FILED JULY 19, 1912.
1,061,237.
Patented May 6, 1913.
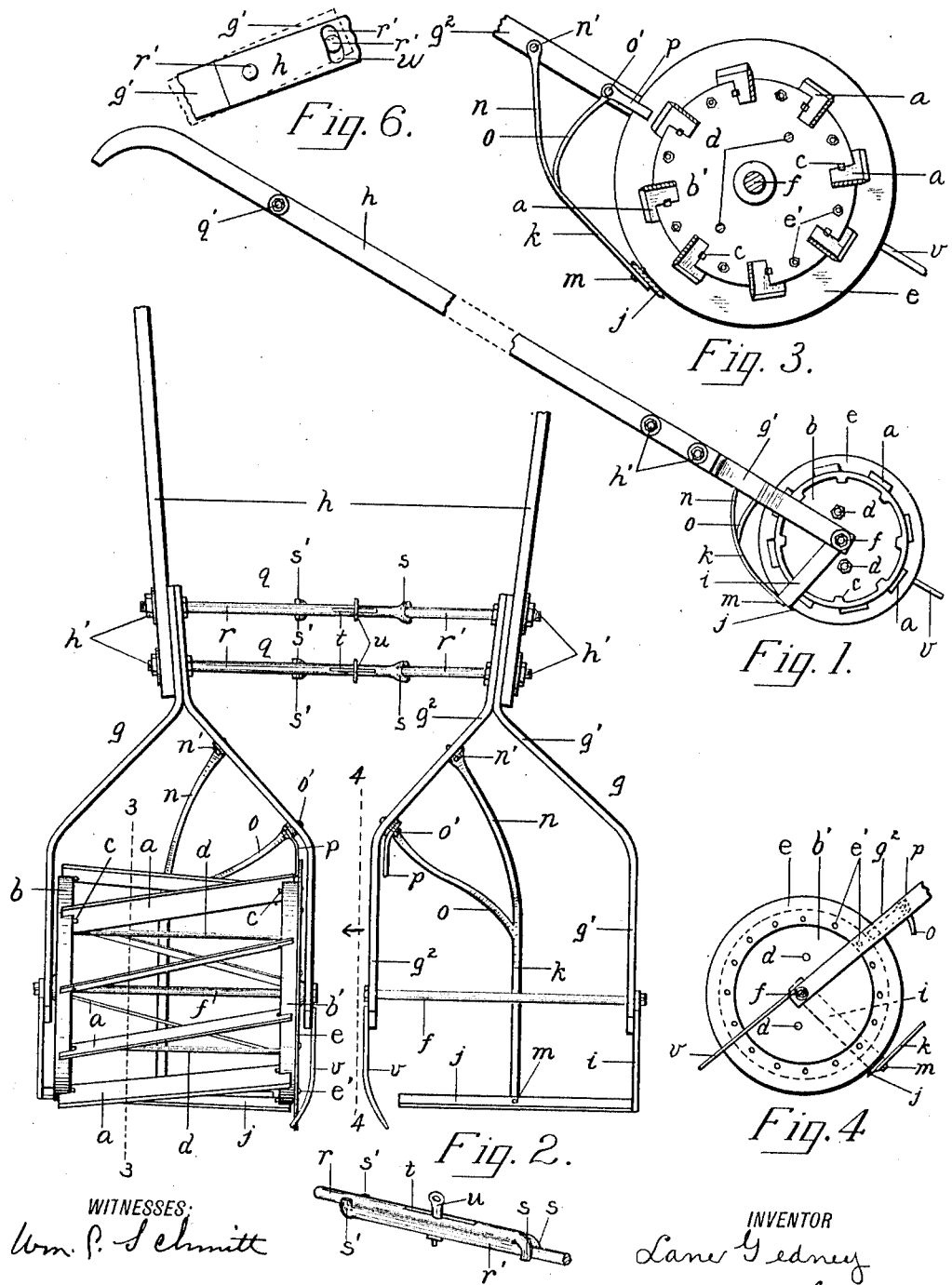

UNITED STATES PATENT OFFICE.

LANE GEDNEY, OF ORCHARDS, WASHINGTON.

GARDEN-WEEDER.

1,061,237.

Specification of Letters Patent.

Patented May 6, 1913.

Application filed July 19, 1912. Serial No. 710,499.

*To all whom it may concern:*

Be it known that I, LANE GEDNEY, a citizen of the United States, and a resident of Orchards, Clarke county, State of Washington, have invented a new and useful Improvement in Garden-Weeders, of which the following is a specification.

This invention is an implement to be used in gardens for the cutting of weeds which grow near the plants and are deleterious to the growth of the latter.

One of the main objects of this invention is to provide an implement whereby the weeds encompassing a plant may be cut without injuring the plant itself in any way. This object is accomplished by constructing the implement in two units, symmetrical with respect to a common point, built so as to straddle a row of vegetables and providing suitable guards, so that the operation of the implement will not undermine, cut, or bury the plants. The device also includes certain adjustable parts in order to provide for the spacing apart of the units of the implement so as to adapt the latter to rows of various widths. The device is also adapted to enable the operator of this implement to cultivate the ground at various depths.

In the accompanying drawings: Figure 1 is a side elevation of my device, showing it in its normal position when in operation; Fig. 2 is a fragmentary front elevation of my device, on a larger scale, with certain parts removed so as to show more clearly the specific construction of other parts; Fig. 3 is a vertical section on the line 3—3 of Fig. 2, looking toward the right; Fig. 4 is a view taken on the line 4—4 of Fig. 2, looking toward the left, thus in the direction pointed by the arrow; Fig. 5 is a perspective view of a portion of the adjusting rods; and Fig. 6 is a fragmental side elevation of the handle bars at the point of their connection by the adjusting bars; the nuts normally used to secure such connection have been removed so as to show the slot by means of which the depth of cultivation is regulated; in dotted lines are shown the positions assumed by these parts after an adjustment has been made.

I shall describe the details of but one unit of my implement, the two units being identical in construction throughout.

Blades, $a$, run diagonally between the rims of the wheels, $b$, $b'$, the blades being maintained in place by lugs $c$. Reinforcing rods, $d$, also connect the wheels, $b$, $b'$, so as to provide a stiff, firm structure. On the outermost side of the inner wheel, $b'$, is a circular flange-like disk $e$, fastened rigidly to the rim of the wheel $b'$ by the rivets $e'$. This disk I shall refer to as the guard disk, because its function is to prevent the plant from being injured by the weed cutting blades, and to prevent dirt from being thrown on the plant. The whole structure is rotatably journaled on the shaft $f$.

Rigidly fastened on the shaft, $f$, is a frame supporting the handle bars, $h$, of the implement and the blade, $j$, which does most of the cutting. This frame consists of a bifurcated member $g$, built of two arms, $g'$, $g^2$. The free ends of these arms are rigidly journaled to the shaft $f$, their common ends being adjustably bolted to the handles $h$, see Fig. 6. Rigidly attached to the arm $g'$ is a bar $i$, which supports the blade $j$. This blade $j$ should run beneath the surface of the ground when the implement is being operated, so as to cut weeds as close to their roots as possible. When the implement is operated the blades, $a$, will shake the weeds clear of any adhering dirt and will then cut them up in a number of pieces. The blades will then cut the roots of the weeds beneath the surface of the ground. This process will prevent the weeds from any further growing for a much longer period than if the weeds had only been severed once. As a further support for the blades $j$, I provide a forked member $k$, having a stem fastened to the blade $i$, as shown at $m$, and its prongs, $n$, $o$, fastened to the arm $g^2$, as shown at $n'$ and $o'$ in Figs. 2 and 3. The outwardly projecting curved fending fingers, $v$, are rigidly attached to the member $g^2$ and adapted to push aside the lower branches of the plants between which my device is run, thus preventing such branches from being struck by the revolving blades, $a$.

A dirt cleaning finger or scraper, $p$, rigidly suspended from the arm $g^2$, is positioned so that the operation of the implement will cause this finger to relatively move in a plane parallel to the guide disk $e$ and adjacent to the same, thereby cleaning the latter from any adhering dirt.

Two units are arranged as shown in Fig. 2, being fastened to the handle bars $h$, which are connected by the tie rods $q'$ and the adjusting bars $q$, the latter also serving as tie rods. Said adjusting bars are made with two members $r, r'$. The inner ends of these members are clawed, as shown at $s, s'$, each pair of claws straddling the other member, so that said members will slide on each other's surface. A slot $t$ is common to each member, and a clamping bolt, $u$, inserted through said slot, will hold the two members in any adjustment in which they may be arranged; the length of the slot should be determined with respect to the extreme space desired between the two units.

In order that the depth of the cultivation may be varied to suit conditions, I provide a circular slot $w$, in which the upper adjusting bar $q$ may be journaled, see Fig. 6. This enables a limited throw to be given to the blade $j$, either up or down, as desired.

I claim:

1. The combination with a weed-cutting device comprising a main frame, a revolving frame journaled therein, an endless series of diagonal blades affixed on the periphery of said revolving frame, and a cutter blade affixed at the base of said main frame exterior of the path of said diagonal blades and rearward of the axis about which the latter rotate, of an annular guard disk provided at one side of said revolving frame perpendicular to the axis of the latter for the purpose specified; and a scraper affixed to the main frame, adapted to bear against and remove adhering dirt from said guard disk.

2. The combination with a weed-cutting device comprising a main frame, a revolving frame journaled therein, an endless series of diagonal blades affixed on the periphery of said revolving frame, and a cutter blade affixed at the base of said main frame exterior of the path of said diagonal blades and rearward of the axis about which the latter rotate, of an annular guard disk provided at one side of said revolving frame perpendicular to the axis of the latter for the purpose specified; a scraper affixed to the main frame, adapted to bear against and remove adhering dirt from said guard disk; and an outwardly projecting fending finger attached to the main frame adjacent said guard disk.

3. A weeding implement comprising a pair of weed cutters each comprising a main frame, a revolving frame journaled therein, an endless series of diagonal blades affixed on the periphery of said revolving frame, and a cutter blade affixed at the base of said main frame exterior of the path of said diagonal blades and rearward of the axis about which the latter rotate; an annular guard disk provided at the inner sides of the revolving frames of said weed cutters perpendicular to the axis of the latter for the purpose specified; a pair of handle bars; and connections between the handle-bars, said connections adjustable to vary the space intermediate said weed cutting elements.

4. A weeding implement comprising a pair of weed cutters each comprising a main frame, a revolving frame journaled therein, an endless series of diagonal blades affixed on the periphery of said revolving frame, and a cutter blade affixed at the base of said main frame exterior of the path of said diagonal blades and rearward of the axis about which the latter rotate; an annular guard disk provided at the inner sides of the revolving frames of said weed cutters perpendicular to the axis of the latter for the purpose specified; a pair of handle bars; connections between the handle-bars, said connections adjustable to vary the space intermediate said weed cutting elements; and the means securing the handle bars to the frames of the weed cutters being adapted to permit the adjustment of the portion of the handle-bars seized by the hands at an angle relatively to the portions to which the frames of the weed cutters are affixed.

5. A weeding implement comprising a pair of weed cutters each comprising a main frame, a revolving frame journaled therein, an endless series of diagonal blades affixed on the periphery of said revolving frame, and a cutter blade affixed at the base of said main frame exterior of the path of said diagonal blades and rearward of the axis about which the latter rotate; scrapers affixed to the main frame, adapted to bear against and remove adhering dirt from said guard disks; an outwardly projecting fending finger attached to the main frame adjacent said guard disks; a pair of handle bars; connections between the handle-bars, said connections adjustable to vary the space intermediate said weed cutting elements; and the means securing the handle bars to the frames of the weed cutters being adapted to permit the adjustment of the portion of the handle-bars seized by the hands at an angle relatively to the portions to which the frames of the weed cutters are affixed.

6. In a weeding implement, the combination of a pair of weed cutters each comprising a main frame, a revolving frame journaled therein, an endless series of diagonal blades affixed on the periphery of said revolving frame, and a cutter blade affixed at the base of said main frame exterior of the path of said diagonal blades and rearward of the axis about which the latter rotate; a pair of handle bars; tie-rods, longitudinally adjustable, having nuts threaded on their outer ends, said rods extending through the handle-bars and the main frames of said weed cutters, and the nuts threaded on said rods being arranged to clamp said main frames to said handle-bars respectively; and the orifices in the handle-bars and the main frames of said weed cutters through which said tie-rods are inserted being adapted to permit the adjustment of the handle-bars at an angle to the main frames of the weed cutters.

LANE GEDNEY.

Witnesses:
  WM. C. SCHMITT,
  CECIL LONG.